Jan. 17, 1961   G. JENDRASSIK   2,968,435
PRESSURE EXCHANGERS
Filed June 20, 1952   5 Sheets-Sheet 1

Inventor
George Jendrassik
By Stevens, Davis, Miller & Mosher
his Attorneys

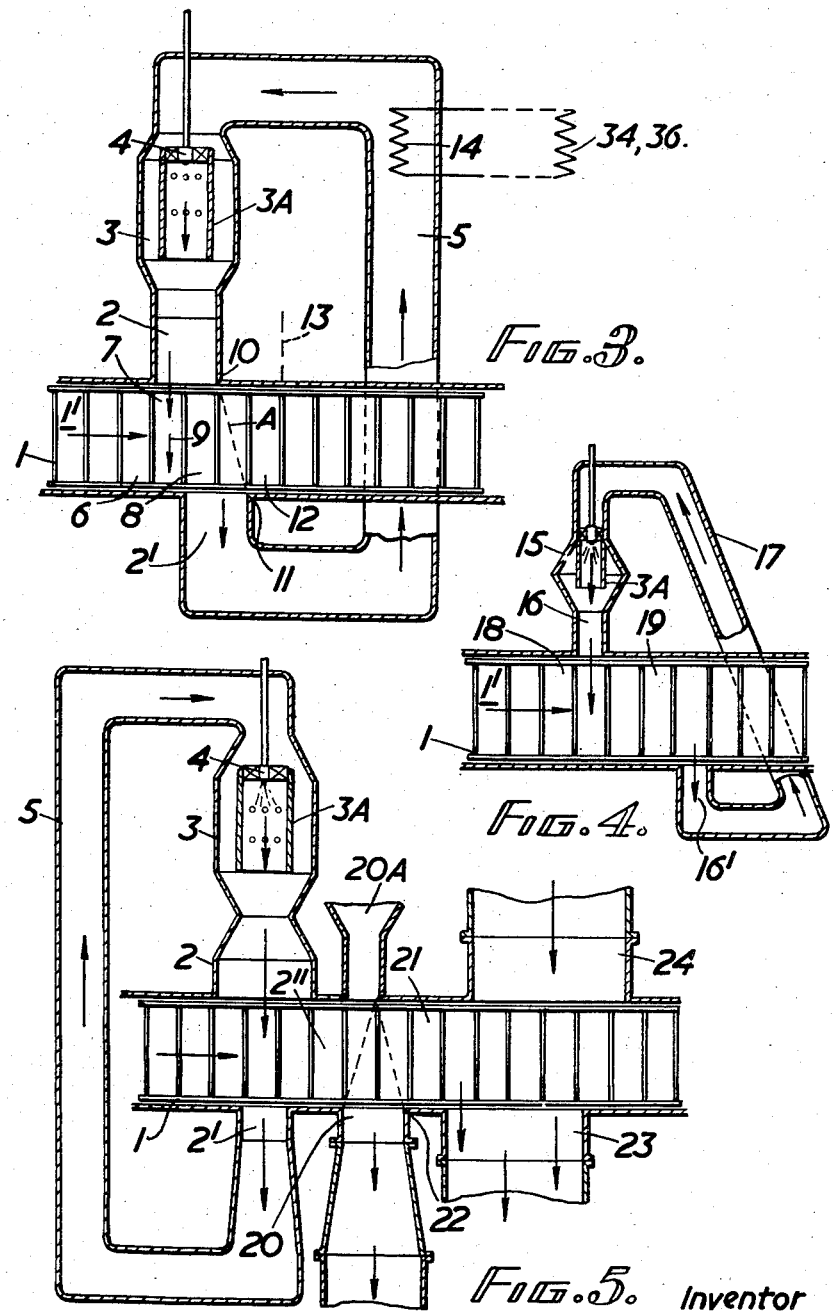

Inventor
George Jendrassik
By his Attorneys

Jan. 17, 1961 G. JENDRASSIK 2,968,435
PRESSURE EXCHANGERS
Filed June 20, 1952 5 Sheets-Sheet 5

Inventor
George Jendrassik
By Stevens, Davis, Miller & Mosher
his Attorneys

United States Patent Office 2,968,435
Patented Jan. 17, 1961

2,968,435

PRESSURE EXCHANGERS

George Jendrassik, London, England; Andre G. T. Boszormenyi and Clara Jendrassik, executors of said George Jendrassik, deceased, assignors, by mesne assignments, to Jendrassik Developments Limited, London, England Filed June 20, 1952, Ser. No. 294,757

Claims priority, application Great Britain June 25, 1951

25 Claims. (Cl. 230—69)

This invention relates to rotary pressure exchangers of the kind comprising a ring of cells for the compression or expansion of gas, ducting to lead gas to and from the cells at heat input and heat rejection stages, and means for effecting relative rotation between the ring of cells and the ducting.

Heat input can be effected by replacing the cooler gas in the cell partly or wholly by gas of higher temperature, in which case the heating may be effected outside the cells, for example by the combustion of fuel in a combustion chamber, before returning the heated gas to the cells. Another way of effecting this heating may consist in producing internal combustion in the cells themselves by introducing the fuel into them, e.g. by injecting a liquid fuel. To produce this internal combustion, nevertheless, a sufficient turbulence in the cells has to be established to permit the completion of the process in the time available for this purpose; alternatively the distribution of the fuel may be effected by means of a gas jet of higher pressure. Whether the heating be internally or externally of the cells gas displacements and speeds must be produced for which it has hitherto been envisaged that the use of mechanically driven compressors, fans, or impellers would be necessary.

One aim of the present invention is to provide pressure exchangers in which the said gas displacements may be produced, wholly or to a considerable extent, by pressure differences created by heating the gas in the cells at substantially constant volume, or in a way which has substantially the same effect, so that the use of the mechanical devices mentioned may be avoided, or at least so that the amount of work wasted in them may be reduced.

The present invention, according to one aspect, provides a rotary pressure exchanger in which the ducting at a heat input stage comprises an inlet branch to lead gas into the cells, an outlet branch to lead gas from the cells, and an interconnection between the said branches, externally of the cells, to form a ducting system substantially closed.

It is convenient in practical machines for the cells to be incorporated in a rotor which is rotatable relative to the gas ducting, and the following description will, for convenience, be mainly in terms of such machines, but it is to be understood that this does not exclude the possibility of using a stationary cell drum and rotary ducting structure.

"Substantially closed" means that in operation no gas is withdrawn from the ducting system except possibly in such quantities as would not affect the properties of the machine. For example, where the function of the pressure exchanger is to provide a supply of hot gas, e.g. for expansion in a turbine or other heat engine, this supply is provided by means of separate gas extraction ducting not in effective communication, in the working conditions, with the heat input ducting. Having regard to the operating speed of the machine and the relative size of the cells and ducting the momentary communication of a cell simultaneously with the heat input duct and the gas extraction duct may be permitted so long as such communication is so brief that no gas impulse can pass from one duct to the other. Such momentary communication is not to be considered as "effective communication in the working conditions." When the machine is static it will be realised that there may be a clear simultaneous connection between a cell and both ducts referred to.

During the process of heat input and the corresponding gas displacements, substantially no gas is extracted from the heat input ducting system, so that if a particular cell of the rotor drum comes in communication with the duct containing the means for heat introduction and such communication is severed after effecting heat introduction, the cell will contain substantially the same amount of gas (the mass of which may be increased by the fuel introduced) as it contained when the communication was established. Since the temperature of the gas in the cell has been raised, its pressure will necessarily be higher. Thus, in the ducting space containing or in communication with the means for heat introduction a pressure higher than in the cells containing the cooler gas must exist. This pressure difference is utilised for the production of the necessary gas displacements.

If the machine is primarily for supplying useful hot gas, this may as mentioned above, be supplied by separate gas extraction ducting which is not in effective communication with the heat input ducting in the design conditions of operation. This gas extraction duct may be located so that it connects with cells which have left the heat input stage and not yet reached the heat rejection stage, or alternatively it may be located to connect with cells which have left the heat rejection stage but not yet reached the heat input stage. This extraction may be either on an upstream or downstream side of the rotor, relative to the direction of gas flow through the cells in the heat input stage.

Having regard to the object of producing gas displacements non-mechanically the inlet and outlet branches of the heat input duct may be so positioned that, proceeding in the direction of relative rotation, a given cell is opened to the inlet branch before it becomes open to the outlet branch. Similarly, the inlet and outlet branches may be so positioned that a cell is closed from the inlet branch before it becomes closed from the outlet branch; alternatively the sequence may be in the converse order.

This opening or closing of a cell by the edge of a duct is not a very accurately defined event in the working conditions. For practical purposes a cell might be accepted as open to a duct if at least a quarter to one third of its area has been freed by the duct edge, and closed if less than a quarter to one third of its area is left free. Whether the opening or closing is "effective" depends upon the design features and speed of individual machines.

The heat input means may be a combustion chamber located in the upstream or inlet branch of the heat input ducting, and this chamber may be so positioned that combustion is complete before the hot gases reach the cells. Alternatively, however, the arrangement may be such that combustion does not occur, or is not completed, until the gases have reached the cells themselves. For such a purpose the inlet and outlet branches of the heat input ducting may be staggered circumferentially so that a cell cannot simultaneously communicate with both branches. Thus, in passing from one branch to the other, each cell may be completely closed off for a short period during which combustion at constant volume occurs within the cell, or is complete therein.

The invention, according to another aspect which may be quite independent of the features of the heat input ducting, may provide a pressure exchanger comprising cells for the compression and expansion of gas, and ducting for scavenging the cells at a heat rejection stage, wherein there is provision for introducing into said scavenging ducting a stream of gas supplied from the cells and having a velocity which is higher than the velocity of the scavenging stream, so that the higher velocity stream operates to promote the scavenging stream by reason of the frictional contact between said streams.

To facilitate understanding of the invention various examples according to it will be described with reference to diagrammatic drawings, but before so doing it is desirable to familiarise the reader with the structure and terminology of a pressure exchanger of previously proposed type. For this purpose reference is made to Figures 1 and 2 of the accompanying drawings, of which Figure 1 represents an exploded perspective view of such a machine, and Figure 2 represents the "end plates" alone. Some examples of pressure exchanger according to the present invention will be described with reference to the accompanying Figures 3-10, of which:

Figure 3 is a diagrammatic development of a cell rotor shown in relation to heat input ducting.

Figure 4 shows an alternative construction of heat input ducts.

Figure 5 shows heat input, gas extraction and low pressure scavenging ducts positioned in relation to a developed cell rotor.

Figure 7a shows a modified scavenging duct.

Figure 1:
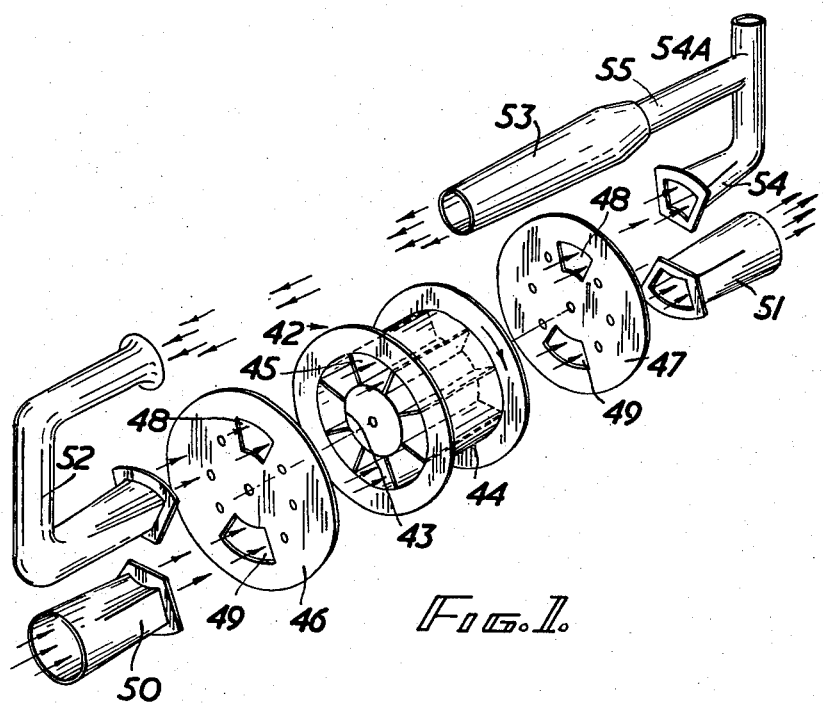

The pressure exchanger shown in Figure 1 consists of a rotor 42 comprising inner and outer cylinders 43, 44 which are separated by radiating partition walls 45 which in combination with the cylinders mentioned define open ended cells of approximately sector shaped cross section. The rotor so formed is mounted for rotation between two end plates 46, 47 in each of which is formed an opening 48 and an opening 49 for the purpose of conducting gas to and from the open ends of the cells as explained below. Atmospheric air is taken in through a duct 50 registering with opening 49 and hot exhaust gas is emitted to atmosphere by a duct 51 registering with the other opening 49 and when the rotor is driven there is a continuous stream of gas passing through ducts 50 and 51 and the cells registering with them. This is the low pressure scavenging or heat rejection stage. The opening 48 in one end plate is connected to an inlet duct branch 52 leading from a combustion chamber 53 and the opening 48 in the other end plate is connected to an outlet duct branch 54 which discharges hot gas some of which is led by duct 54A to a place of use (for example to a turbine or other heat engine for expansion therein) and the remainder is returned by branch 55 to the combustion chamber 53 into which fuel is sprayed and burnt in the gas flow. When the machine is operating there is a continual circulation of gas through the ducting just described and the cells registering therewith. This is the high pressure or heat input stage of the machine.

Fans (not shown) are provided to promote the scavenging flow.

Figure 2:
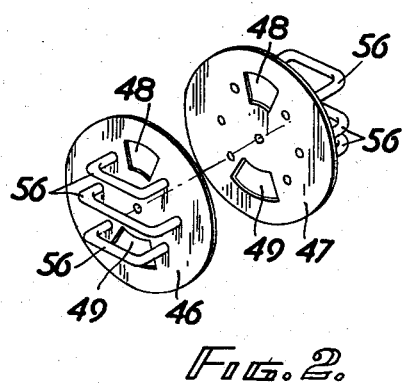

The end plates 46, 47 are also shown in Figure 2 in order to illustrate the pressure exchange pipes 56 not shown in Figure 1. These serve in known manner to connect cells which have just left the heat input stage with other cells which have left the heat rejection stage and are approaching the heat input stage. By this means there is a so-called "exchange of pressure" between the interconnected cells such that in operation a cell leaving the heat input stage has its pressure lowered by steps until it reaches the heat rejection stage while the cell which has left the heat rejection stage has its pressure raised by corresponding steps until it reaches the heat input stage where the effect of combustion provides the energy to meet the losses. The pressure exchange pipes 56 are not essential but represent one species of machine, or these pipes may have entirely different shapes to those represented.

Now consider Figures 3-10, each of which is diagrammatic and represents a circumferential development of the cell rotor so that in these diagrams the effect of rotation of the cell rotor or drum is represented by considering the movement of cells as a linear movement from left to right i.e. in the direction of the arrow 1'.

In Figures 3, 2 and 2' are the ducts connecting the cells with the space in which heat introduction is effected. 3 represents a combustion chamber with an injector or burner 4 introducing the fuel which is burnt in a flame tube 3A. The inlet or upstream branch 2 and the outlet or downstream branch 2' are interconnected by ducting 5 to form a substantially closed ducting system in which gas circulates as indicated by the arrows. The ducting 5 passes "behind" the cell rotor as indicated by the broken lines. According to the application and working system of the pressure exchanger other ducting (e.g. for low pressure scavenging, or take-off of useful gas) may be arranged along the periphery but is nevertheless, not indicated on Figure 1. In a cell in the position 6 before communication with ducts 2 and 2' there is gas at a lower pressure prevailing than in these ducts. The latter are so arranged that the upstream end 7 of a cell comes in communication with the upstream branch 2 before the downstream end 8 comes in communication with duct 2'. Thus, the higher pressure in duct 2 produces a pressure impulse in the cell setting up motion in the direction of the arrow 9. When the pressure impulse 9 arrives at the downstream end of the cell, communication with duct 2' is established leaving the gas content of the cell free to escape. Since already heated gas enters the cell at 7 during this period, at least a part of the cell content is replaced by hotter gas. The effect is that of heating the gas in the cell at substantially constant volume. The movement of gas in the cell is stopped by the edge 10 of duct 2 cutting off communication between duct 2 and cell and producing in the present case a depression impulse (dotted line A) which stops the gas movement in the cell. Edge 11 of duct 2' severs the downstream end communication when this depression impulse arrives at the downstream end of the cell. In a cell 12 which has left ducts 2 and 2' there must be a higher pressure than in cell 6. In the case described according to Figure 1, the pressure in cell 12 may nevertheless be lower than that prevailing in ducts 2, 2' and 5, due to the depression A.

It is possible to interchange the positions of edges 10 and 11 in regard to each other, so that edge 11 severs the communication previous to edge 10. In this case it is possible that a higher pressure may prevail in cell 12 than in ducts 2, 2' and 5, due to a "build up" of pressure in the cell. This would be the case if the edge 10 were to be positioned as indicated by the dotted line 13.

Instead of the combustion chamber 3, a heating device (heat exchanger) 14 can be used which heats the gas by heat transfer or radiation and not by internal combustion of fuel. In both cases the flow resistance of the heat introducing devices is overcome by the effect of the pressure difference between the pressure in duct 2 and cell 6. Heating device 14 can also be applied in combination with the combustion of fuel in a combustion chamber such as 3.

Figure 4 shows an arrangement for producing internal combustion in the cells. In this case the chamber 15 which is connected at its downstream end through duct 16 with the cells, is preferably a sort of pre-mixing chamber in which combustion may also occur. The main combustion is, however, effected in the cells themselves. Since the pressure prevailing in ducts 16, 16', 17 and in chamber 15 is higher than in cell 18, there is a gas inrush into the cell 18 when communication with it is established. This gas inrush is utilised to carry the fuel, possibly already burning due to ignition in the chamber 15, into the cell and to establish there, if needed, a complete fuel/air mixing. Since duct 16' is in communication with cells in which combustion has already taken place, and in which therefore the pressure is already higher, the amount of gas leaving duct 16 is replaced by the gas entering duct 16'. In view of the circumferentially staggered arrangement of the ducts 16, 16' relative to each other, there is a short period when a cell, in travelling from one duct to the other, is shut off from both. Thus during the time a cell is travelling from position 18 into position 19 the internal combustion in the cells takes place at constant volume and the pressure is raised. In this arrangement the chamber 15 may be much smaller than in the previous one (Figure 3), or may even be entirely dispensed with in which case the inrush of gas may be utilised for atomisation or distribution of the fuel (e.g. solid pulverised fuel). Duct 16' may alternatively be arranged on the same side of the cells as duct 16.

In Figure 5 the invention is shown as applied to a pressure exchanger producing compressed gas for power production purposes or otherwise. In this arrangement the rotor cells after leaving the ducts 2' and 2 come in communication with the gas extraction duct 20 through which some of the gas is withdrawn for the above mentioned purposes. This tapping of the cells causes a pressure drop in them so that the cells which come into position 21 have a lower pressure than those at 2" leaving the duct 2. This tapping process, if properly timed, can be arranged so that the pressure obtained for the user would lie between the above mentioned two pressures at 2" and 21 respectively. This is obtained if the depression impulse (dotted line) caused by communication of the cell with duct 20 approximately just reaches the other end of the cell and is returned by reflection to reach the downstream end of the cell when communication between the cell and duct 20 is cut off by the edge 22. In its further movement the cell comes in contact with the low pressure scavenging duct branch 23 through which the hot cell contents are exhausted and heat thus rejected. Fresh air en'ers through the duct branch 24. To effect the scavenging any means to produce the pressure or velocity needed may be used, but advantageously the residual pressure in cell 21 may be made use of. This is done by bringing the cell into communication with branch 23, before branch 24, the duct walls being staggered as shown, for this purpose. Thus the residual pressure produces a velocity by expanding into branch 23. On the other hand, if at the end of this low pressure scavenging there is still a velocity left in the cell, this could be utilised to produce some supercharging effect by the closing of the downstream end of the cell before the upstream end in commun'cation with duct 24, is closed. This is again effected by the "stepwise" arrangement of the duct walls, as shown. It should be mentioned that the duct 20 can be placed before the ducts 2 and 2' instead of after (e.g. compare Figures 5 and 6), or there may be a duct 20 both before and after. It is possible to use several ducts such as 20 for withdrawing gas from the cells. These ducts may be placed to contact the cells successively.

Alternatively this gas extraction duc'ing may comprise two separate ducts communicating with opposite ends of a cell (e.g. the duct 20 and an additional duct 20A, Figure 5). In such a case the width of each duct could be less, e.g. both the width of the duct 20A.

It is also possible by appropriate dimensioning to extract from the cell so much useful gas by the extraction duct 22 or by the nozzle 20' Figure 7A (referred to below) that a partial vacuum is left behind in the cell. In this case in order to promote scavenging the upstream branch 24 of the scavenging ducting should become open to the cell before the downstream branch 23. By this arrangement when the communication between the cell and the upstream branch 24 is established the air rushes into the cell and a speed is created therein, which, when the downstream branch opens, effects the scavenging.

Figure 6:
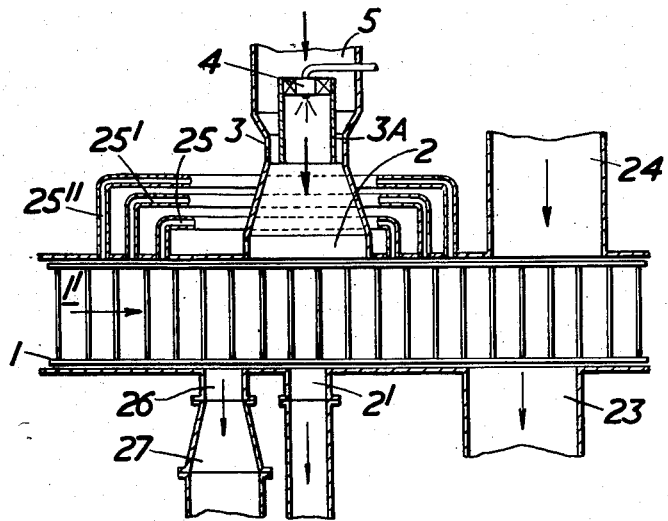
Figure 6 shows a pressure exchanger constructed to provide a supply of compressed air.

Figure 6 shows an arrangement for a similar application to Figure 5. A difference is that in this case pressure exchange pipes 25, 25' and 25" are also shown establishing communication between cells leaving the high pressure zone and cells approaching same, thus making full use of the known pressure exchanging process whereby cells are raised in pressure by steps while other cells fall in pressure by steps. Duct 26 serves to tap the cells and carries compressed gas to its useful application. Duct 26 corresponds to duct 20 in Figure 5 and comprises a diffuser 27 to reduce velocity losses.

Figure 7:
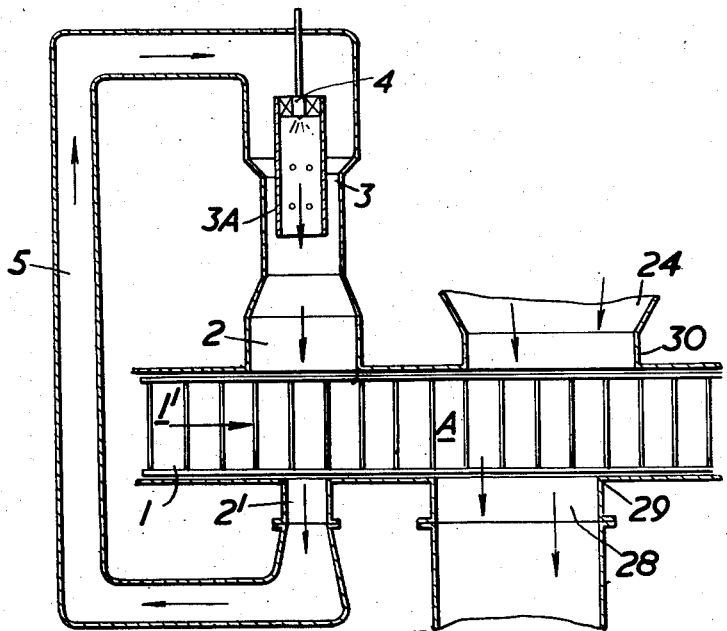
Figure 7 is a pressure exchanger for producing a propulsive thrust.

In Figure 7 is shown an arrangement in which there is no separate duct for tapping off gas for useful purposes. In this application the cells leaving the high pressure or heat input stage (ducts 2 and 2') open directly into the low pressure scavenging (i.e. heat rejection) duct 28 through which the whole exhausting is effected. When the cells reach position A (Figure 7) they have a relatively high pressure in them, and empty their contents with high velocity into duct branch 28 and produce a high velocity in it. When the cells come in communication with the fresh air intake duct 24, after expansion in them has taken place the velocity prevailing in them, or the depression prevailing at their upstream end, will effect a powerful scavenging, so that when the downstream end of the cell registers with edge 29 of the scavenging or exhaust branch, and further gas movement in the cell ceases, a rise of pressure is produced in the cell. The edge 30 of intake duct 24 closes the cell when the pressure impulse created by the edge 29 has arrived approximately at the upstream end of the cell.

As an alternative the supply of useful gas may be discharged partly into the low pressure scavenging ducting and partly into separate ducting provided for that purpose.

Figure 7 is an arrangement which lends itself to jet propulsion, e.g. of aircraft. In such a case the duct 28 would be prolonged to form a jet pipe.

Figure 7A shows a similar arrangement to Figure 7 but in which useful hot gas which contributes to the propulsive jet is discharged through the duct 20' which is in the form of an expansion nozzle located so as to deliver into the low pressure scavenging duct 28. The "ejector" effect of the gas discharged from the nozzle 20' assists in inducing the overall scavenging flow within the duct 28. The gas discharged from nozzle 20' and duct 28 both may contribute to the propulsive jet. The form of the duct 20' may be according to the pressure conditions either convergent, divergent or convergent-divergent.

In the arrangement according to Figure 7A the downstream part of the heat rejection scavenging duct is bounded on the one side by the wall designated 28 and on the other side by the V-shaped wall dividing that duct from the nozzle 20'.

In the ducts 24 and 28 partition walls or a cascade of vanes may be arranged to improve flow conditions. In particular diffusers may thus be incorporated in the duct 28 and/or the duct 28 may in itself form a diffuser to improve scavenging.

In more detail the operation of Figures 7 and 7A is as follows: In duct 28 the gas discharged at high velocity either direct from the cells (Figure 7) or through a nozzle such as 20' (Figure 7A), representing the thrust producing jet, mixes with the gas removed from the cells at a much lower speed during the scavenging, i.e. when the cell registers both with duct 24 and duct 28. This mixing or friction between these gas streams of different velocities has the effect of reducing these velocity differences and while reducing the speed of the jet it promotes the scavenging considerably. However, the useful thrust of the jet will not be reduced unnecessarily by this effect. The following four factors all contribute to effect a powerful scavenging:

(1) The speed prevailing in the cell after the expansion of its contents when the cell is thrown open to the air duct 24.

(2) The depression which may prevail at the upstream end of the cell at this moment.

(3) The depression created at the downstream end of the cell by the diffuser effect of duct 28 or by diffusers arranged in same, and last, but not least (4) The friction between the high speed jet and the slower scavenged gas.

In order to exploit factor (4) the exhaust duct or jet pipe should be sufficiently long in relation to the radial width (hydraulic diameter of the cross section) of a cell, and the form of the duct should preferably be such that its cross section which is non-circular (e.g. sector shaped) adjacent the cells merges gradually to an approximately circular shape at its end orifice.

The useful gas produced by any of the pressure exchanger arrangements can be used to produce jet thrust and also to promote scavenging in the above described way.

If the useful gas extracted from the pressure exchanger is not introduced into the exhaust duct serving for the low pressure scavenging, the scavenging can be effected by the expansion of the gas contained in the cells when they make contact with the low pressure scavenging duct (Figure 7). For this purpose the ducts for the extraction of useful gas, the channels 25, 25', 25" (Figure 6) where present, and the rest of the pressure exchanger should be so dimensioned that the necessary residual pressure is left in the cells approaching the low pressure scavenging zone.

The high velocity gas stream (useful gas) may be introduced into the low pressure scavenging duct at a much reduced speed after such stream has undergone expansion (e.g. in a turbine or piston engine). In such a case however the assistance given to the scavenging will be much less marked.

Blades may be provided which, when rotated serve to promote the required gas movements. Thus, for example, the ends of the cell partition walls may be so shaped that, when starting the pressure exchanger by rotating the rotor in relation to the ducts, the cell partitions act as fan blades to induce gas movements of the same direction as in normal operation. This effect may be produced if the upstream end of a cell partition wall is curved in the direction of rotation so that the convex side faces upstream, and the downstream end of the partition wall is bent in the direction opposite to the rotation so that the convex side faces downstream (see wall indicated at 1B, Figure 7). This same effect could also be achieved by giving helicoid forms to the partition walls. If the relative rotation is effected by rotating the ducting in relation to a stationary ring of cells, then the ducting may be provided with vanes for the same purpose.

Figure 8:
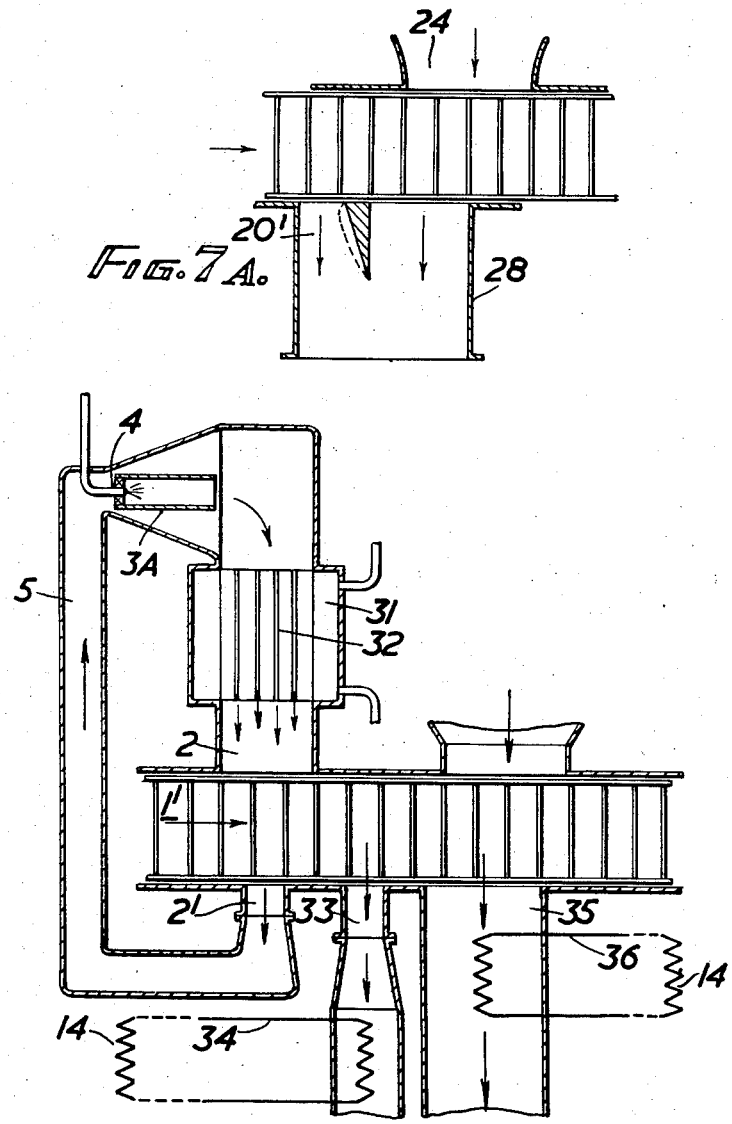
Figure 8 is a pressure exchanger constructed as a combustion machine for heating purposes.

In Figure 8 is shown an application of a pressure exchanger as a combustion machine for heating purposes, for instance for providing hot gas for boiler heating, some or all of which gas may subsequently be expanded in a gas turbine.

The fuel introduced through spray nozzle 4 or otherwise heats the compressed gas in the closed ducting system and this gas gives up part of its heat to the tubes of a heating device or boiler 32. Withdrawal of gas under pressure takes place through duct 33 and the gases withdrawn give up their heat in a heating device or heat exchanger 34. In the low pressure exhaust (heat rejection) duct 35 a further heating device or heat exchanger 36 can be arranged to take up the rest of the residual heat. The heating devices 31, 34 and 36 may be united, as are the heating surfaces in a boiler.

The heat taken up by a heat exchanger such as 34 or 36 may be used to preheat the gas in the heat input ducting. Thus the heat exchanger 34, 36 or both may be combined with the heat exchanger 14 in Figure 3, as indicated in the diagrams. A part, or the whole, of the gas compressed and extracted can be utilised to produce mechanical work.

Figure 9:
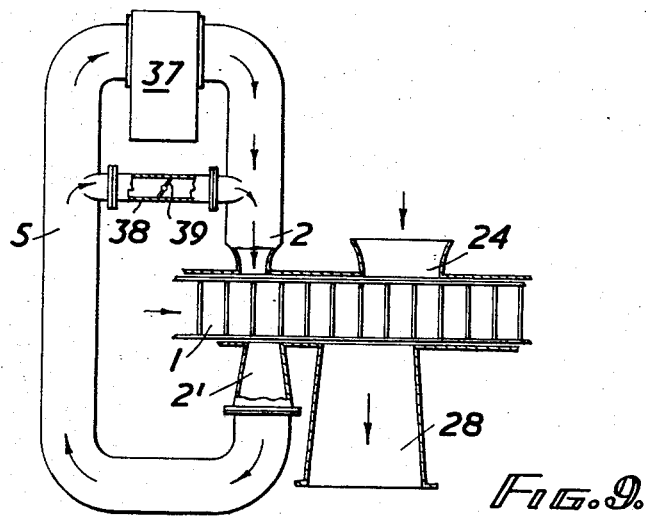
Figure 9 shows a pressure exchanger applied to the supercharging of an engine or process.

The type of arrangement illustrated in Figure 7 may also be used for the supercharging of any process or apparatus e.g. an internal combustion piston engine, which emits a greater volume of gas than it takes in. Such an application is shown in Figure 9 in which the apparatus 37 to be supercharged is connected into the closed ducting system at the heat input stage so that gas leaving the cells at 2' is supplied to the intake of the apparatus 37 and gas exhausted therefrom at a high temperature is reintroduced into the cell by way of the duct branch 2. Thus the apparatus 37 replaces the combustion chamber. If a high supercharging pressure is aimed at the arrangement of the opening and closing edges of the ducts 2 and 2' as shown in Figure 3 in full lines is preferable, and preferably a diffuser should be incorporated in the outlet branch 2' as shown in Figure 5. In order that the gas may be caused to short circuit the apparatus 37 when required a by-pass 38 is provided for this purpose having a valve or other control member 39 in it.

Figure 10:
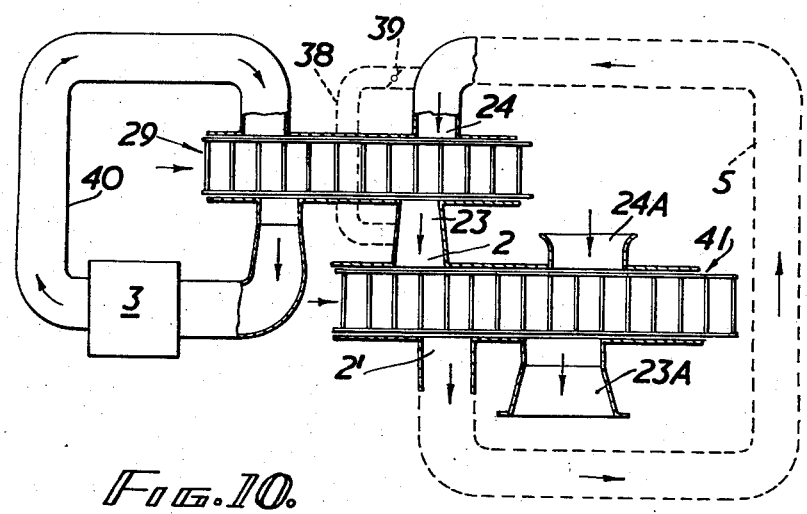
Figure 10 shows a development of Figure 9.

In Figure 10 is illustrated a more elaborate kind of layout in which the apparatus supercharged is itself a pressure exchanger. As shown a pressure exchanger indicated at 29 comprises heat input ducting 40 consisting of a substantially closed system as previously described. In the system is arranged a heat input device 3 (e.g. a combustion chamber). At the heat rejection or low pressure stage of the pressure exchanger 29 inlet and outlet duct branches 24, 23 are provided. The outlet branch 23 is connected as shown with the inlet branch 2 of the heat input or high pressure ducting of a pressure exchanger 41. The outlet branch 2' of the heat input ducting of pressure exchanger 41 is connected by ducting 5 with duct 24 so as to constitute a substantially closed system in previously described manner. The pressure exchanger 41 is provided on the low pressure or heat rejection side with conventional inlet and outlet ducts 24a, 23a whereby fresh gas e.g. air at atmospheric pressure, is taken in at 24a to replace exhaust gas discharged at 23a from the cells. Thus the effect is that the pressure exchanger 29 is supercharged by and works at a higher mean pressure than the pressure exchanger 41. This arises from the fact that the latter takes in air at atmospheric pressure at 24a whereas the intake of pressure exchanger 29 at 24 is gas compressed above the ambient pressure at 24A. The arrangement may therefore be related to Figure 9 by considering 41 as equivalent to the pressure exchanger shown at Figure 9 and the whole of the pressure exchanger 29 is equivalent to the apparatus 37. A by-pass and valve 38, 39 in Figure 10 correspond functionally with the similarly numbered parts in Figure 9. The heat input means 3 for the pressure exchanger 29 may be another apparatus to be supercharged, such as a piston engine. In such a case the entire arrangement would comprise two pressure exchangers, one supercharging the other, with the supercharged pressure exchanger itself serving to supercharge apparatus 3.

In any of the above embodiments the rotor of the pressure exchanger may be "self-driven" (e.g. by means of appropriate blading), and in the same way power may be provided to drive auxiliaries, such as fuel pumps. Adjustable-angle blading may be provided in the ducting to control the direction and velocity of the gas flow in order to control the rotational speed of the rotor.

The condition that there should be no effective communication between any gas extraction ducting and the heat input ducting may be satisfied, in most of the examples given, if a cell, in making and severing communication with the heat input ducting, registers first with the opening edge of the inlet or upstream branch of the heat input ducting, then with the opening edge of the outlet or downstream branch, and then successively with the closing edges of those branches either of such edges being contacted first; the opening edge of the duct for extraction of gas then registers with the cell only after the latter has registered with both closing edges of the heat input ducting. The required condition may also be fulfilled in some instances if the gas extraction ducting communicates with cells which are closed from only one branch of the heat input ducting but are still open to the other branch, that is, the opening edge of the extraction duct registers with a cell after only one of the closing edges of the heat input ducting has registered with the cell.

What I claim is:

1. A rotary pressure exchanger comprising a ring of cells for the compression and expansion of gas, heat input and heat rejection stages for the cells, structure adjacent said cell ring mounted coaxially therewith, said structure including an end-plate for the ring of cells and ports through said end-plate, ducting connected to said ports to lead gas to and from the cells at heat input and heat rejection stages, and means for effecting relative rotation between the ring of cells on one hand and the structure and the ducting on the other hand, characterised in that the ducting at the heat input stage comprises an inlet branch to lead gas into the cells, an outlet branch to lead gas from the cells, the inlet and outlet branches being so positioned that during relative rotation each cell communicates with the inlet branch before communicating with the outlet branch, and an interconnection between the said branches, externally of the cells, to form a ducting system which is closed.

2. A rotary pressure exchanger according to claim 1, wherein heating means is located in said ducting system.

3. A rotary pressure exchanger according to claim 1 wherein gas extraction ducting is provided separate from the heat rejection ducting, said gas extraction ducting being connected to said structure and being not in effective communication with the heat input ducting.

4. A rotary pressure exchanger according to claim 3, wherein the said gas extraction ducting is positioned to communicate with cells which have ceased to communicate with the heat input stage and are not yet in communication with the heat rejection stage.

5. A rotary pressure exchanger according to claim 3, wherein the gas extraction ducting is positioned to communicate with cells which have ceased to communicate with the heat rejection stage but are not yet in communication with the heat input stage.

6. A rotary pressure exchanger according to claim 3, wherein the gas extraction ducting is positioned to communicate with cells which are closed from only one branch of the heat input ducting but are still open to the other branch.

7. A rotary pressure exchanger according to claim 3, wherein the said gas extraction ducting comprises two separate ducts communicating with opposite ends of a cell.

8. A rotary pressure exchanger according to claim 1, wherein the inlet and outlet branches of the heat input ducting are so positioned that, in the course of the relative rotation, a cell is closed from the outlet branch before it becomes closed from the inlet branch.

9. A rotary pressure exchanger according to claim 1, wherein the inlet and outlet branches of the heat input ducting are so positioned that, in the course of the relative rotation, a cell is closed from the inlet branch before it becomes closed from the outlet branch.

10. A rotary pressure exchange according to claim 1, wherein the outlet branch of the heat input ducting comprises a diffuser duct.

11. A rotary pressure exchanger according to claim 1, wherein the inlet and outlet branches are staggered circumferentially so that a cell cannot communicate simultaneously with both branches.

12. A rotary pressure exchanger according to claim 11, wherein a fuel injection means is so located in the heat input ducting that combustion of at least some of the injected fuel occurs at constant volume in a cell during the short period while it is passing from the inlet branch to the outlet branch but is in effective communication with neither.

13. The combination of an apparatus to be supercharged which exhausts the intaken gas at increased volume, and a pressure exchanger which comprises a ring of cells for the compression and expansion of gas, structure adjacent said cell ring mounted coaxially therewith, ducting connected to said structure to lead gas to and from cells at heat input and heat rejection stages, means for effecting relative rotation between the cell ring on one hand and the structure and the ducting on the other hand, and in which the heat input stage ducting comprises an inlet branch to lead gas into the cells, an outlet branch to lead gas from the cells, and an interconnection between said branches externally of the cells to form a closed ducting system, the apparatus being located in the interconnection, the intake of said apparatus being in communication with the outlet branch of said system, and the exhaust of the apparatus being in communication with the inlet branch of said system.

14. The combination according to claim 13, wherein the apparatus to be supercharged is a boiler furnace.

15. The combination according to claims 13, wherein the apparatus supercharged is itself a pressure exchanger.

16. A rotary pressure exchanger comprising a cell ring for the compression and expansion of gas, heat input and heat scavenging stages for the cells, structure adjacent said cell ring mounted coaxially therewith, ducting connected to said structure for leading gas to and from the cells at heat input and scavenging stages, and means for effecting relative rotation between said cell ring on the one hand and said structure and ducting on the other hand and a connection between the cells and said scavenging ducting through which a stream of gas is supplied from the cells and reaching a velocity which is higher than the velocity of the scavenging stream, so that the higher velocity stream operates to promote the scavenging stream.

17. A pressure exchanger according to claim 16, wherein said scavenging ducting comprises a section upstream of the cells relative to the scavenging stream and a section downstream of the cells, said sections being staggered so that a cell becomes open to the upstream section only after that cell has become open to the downstream section and the contents of said cell has expanded at least partly into said downstream section.

18. A pressure exchanger according to claim 16, wherein said scavenging ducting downstream of the cells has a length which is large in relation to the width of the cells, and has a cross-sectional shape which is non-circular adjacent the cells but merges gradually, without reduction in cross-sectional area, into an approximately circular shape at the end remote from the cells, the design of said ducting being such as to promote mixing of said higher velocity stream and the scavenging stream.

19. A pressure exchanger according to claim 18, wherein said downstream scavenging ducting is designed to effect diffusion of the gas.

20. A rotary pressure exchanger according to claim 16, wherein said scavenging ducting has branches upstream and downstream of the cells, therein the branches are relatively so positioned that each cell becomes open to an upstream branch of said ducting before it becomes open to a downstream branch thereof.

21. A rotary pressure exchanger comprising a ring of cells for the compression and expansion of gas, heat input and heat rejection stages for the cells, structure adjacent said cell ring mounted coaxially therewith, ducting connected to said structure to lead gas to and from the cells at heat input and heat rejection stages, and means for effecting relative rotation between the ring of cells on the one hand and the structure and the ducting on the other hand, said heat input ducting comprising an inlet branch to lead gas into the cells, an outlet branch to lead gas from the cells, the inlet and outlet branches being so positioned that during said relative rotation each cell communicates with the inlet branch before communicating with the outlet branch, and an interconnection between the said branches, externally of the cells, to form a ducting system which is closed, said heat rejection stage comprising scavenging ducting incorporating a duct connection communicating at one end with the cell ring and at the other end with the heat rejection stage ducting for the passage of hot gas from the cells into the heat rejection stage ducting so that scavenging of the cells through the heat rejection stage ducting is promoted by the gas discharged through the scavenging ducting, and separate gas extraction ducting connected to said structure which is not in effective communication with the heat input ducting in the design conditions of operation and through which further hot gas is passed.

22. The combination of an apparatus to be supercharged which exhausts the intaken gas at increased volume, and a pressure exchanger which comprises a ring of cells for the compression and expansion of gas, heat input and heat rejection stages for the cells, structure adjacent said cell ring mounted coaxially therewith, ducting connected to said structure to lead gas to and from cells at heat input and heat rejection stages, means for effecting relative rotation between the cell ring and the ducting and in which the heat input stage ducting comprises an inlet branch to lead gas into the cells, an outlet branch to lead gas from the cells, the inlet and outlet branches being so positioned that during said relative rotation each cell communicates with the inlet branch before communicating with the outlet branch, an interconnection between the said branches, externally of the cells, to form a ducting system which is closed, the apparatus being connected into the closed ducting system at the heat input stage of the pressure exchanger, the intake of said apparatus being connected, via part of said closed ducting system to the outlet branch of said system, the exhaust of the apparatus being connected, via the remaining part of said closed ducting system to the inlet branch of said system and said closed ducting system incorporating a by-pass duct short-circuiting the apparatus and a control member, in the by-pass duct the control member being operable to allow gas to pass through the by-pass duct and short circuit the apparatus.

23. A rotary pressure exchanger comprising cells for the compression and expansion of gas, heat input and scavenging stages, structure adjacent said cell ring mounted coaxially therewith, ducting connected to said structure and in communication with the cells, said ducting leading gas to and from the cells at heat input and scavenging stages, means for effecting relative rotation between the ring of cells on the one hand and the structure and the ducting on the other hand and a nozzle between the cells and the scavenging ducting through which a stream of gas is supplied from the cells and reaches a velocity which is higher than the velocity of the scavenging stream, so that the higher velocity stream operates to promote the scavenging.

24. A rotary pressure exchanger according to claim 1 further comprising scavenging ducting which is additional to the heat rejection stage ducting, the scavenging ducting communicating with the cells at one end and at the other end located to deliver hot gas from the cells into the heat rejection ducting so that scavenging of the cells through the heat rejection ducting is promoted by the gas discharged by the scavenging ducting.

25. A rotary pressure exchanger according to claim 24 in which the additional scavenging ducting incorporates an expansion nozzle.

References Cited in the file of this patent

UNITED STATES PATENTS

| | | |
|---|---|---|
| 1,586,817 | Ljungstrom | June 1, 1926 |
| 1,649,605 | Ljungstrom | Nov. 15, 1927 |
| 1,829,996 | Lysholm | Nov. 3, 1931 |
| 2,045,152 | Lebre | June 23, 1936 |
| 2,363,870 | Karlsson | Nov. 28, 1944 |
| 2,399,394 | Seippel | Apr. 30, 1946 |
| 2,461,186 | Seippel | Feb. 8, 1949 |
| 2,468,826 | Karlsson | May 3, 1949 |
| 2,499,358 | Cooper | Mar. 7, 1950 |
| 2,526,618 | Darriens | Oct. 24, 1950 |
| 2,697,593 | Rydberg | Dec. 21, 1954 |

FOREIGN PATENTS

| | | |
|---|---|---|
| 636,733 | Great Britain | May 3, 1950 |
| 876,601 | France | Nov. 11, 1942 |